(No Model.) 4 Sheets—Sheet 1.

O. A. ENHOLM.
CONDUIT RAILWAY SYSTEM.

No. 555,937. Patented Mar. 10, 1896.

Fig. 1.

Witnesses:
J. B. McGirr.
Jos. H. Milans.

Inventor:
Oscar A. Enholm
by J. S. Barker
Atty.

(No Model.) 4 Sheets—Sheet 2.
O. A. ENHOLM.
CONDUIT RAILWAY SYSTEM.

No. 555,937. Patented Mar. 10, 1896.

Witnesses:
J. B. McGivr.
Jos. H. Milans

Inventor:
Oscar A. Enholm
by J. S. Barker
Atty.

(No Model.) 4 Sheets—Sheet 3.

O. A. ENHOLM.
CONDUIT RAILWAY SYSTEM.

No. 555,937. Patented Mar. 10, 1896.

Witnesses:
J. B. McGirr.
Jos. H. Milans.

Inventor:
Oscar A. Enholm
by J. S. Barker
Atty.

(No Model.)

O. A. ENHOLM.
CONDUIT RAILWAY SYSTEM.

Patented Mar. 10, 1896.

Witnesses:
J. B. McGirr.
Jos. H. Milans.

Inventor.
Oscar A. Enholm
by J. S. Barker
Atty.

UNITED STATES PATENT OFFICE.

OSCAR A. ENHOLM, OF NEW YORK, N. Y., ASSIGNOR TO W. DEAN SMITH, OF SAME PLACE.

CONDUIT-RAILWAY SYSTEM.

SPECIFICATION forming part of Letters Patent No. 555,937, dated March 10, 1896.

Application filed June 15, 1895. Serial No. 552,980. (No model.)

*To all whom it may concern:*

Be it known that I, OSCAR A. ENHOLM, a citizen of the United States, residing at New York, in the county and State of New York, have invented certain new and useful Improvements in Underground Conduits and Electric-Railway Systems, of which the following is a specification, reference being had to the accompanying drawings.

My invention has for its object to improve electric underground or conduit railway systems, more particularly of the class illustrated in my Patent No. 525,539, dated September 4, 1894.

It consists of improvements in the construction of the conduit itself, and of improvements in the electrical and mechanical connections whereby the system illustrated in that patent is more effectually operated and improved in particulars which will be hereinafter pointed out.

In the drawings accompanying this specification I have illustrated my invention as applied to a conduit electric-railway system of the character shown in the said patent; but I do not wish to be understood as thereby limiting my invention to any particular system, as numerous features of the improvements embodied therein are applicable to electric systems of different constructions, as well as to cable systems of propulsion, or wherever an underground conduit is employed.

In the said drawings.

I will first describe those features of my invention which relate particularly to the improvements in the construction of the conduit itself, and those improvements have for their object to cheapen the cost of and reduce the amount of labor involved in construction. To this end I form the yokes of the conduit with centrally-arranged longitudinal extensions, which constitute the floor or bottom of the conduit, these extensions being cast integral with the yokes proper, and so constructed and arranged that they fit one into the other. Besides this the yokes have other novel features of construction which will be pointed out hereinafter.

The yokes proper have the transverse arms 2 2, which are provided at their ends with the chairs 3 or other supports for the rails. By forming the yokes as herein described and arranging the parts of the apparatus as will be set forth, I am enabled to successfully operate a system with a comparatively shallow conduit, so that the yokes need not be over eighteen inches in height. The advantages of all improvements whereby the depth of the conduit may be reduced without impairing the efficiency of the system are readily apparent and need not be set forth in detail.

From the central portions of the yokes and directly below the openings which constitute parts of the conduit-cavity there extend laterally in opposite directions the plates 4 4, which constitute the bottom of the conduit. These plates are cast integral with the yokes proper, and their ends are so shaped that where two sections come together they interlock or fit to each other, this being accomplished by making the end of one plate at each joint with an expanded or socket portion 5, into which the plain end of the adjacent plate fits. These bottom plates 4 are in the form, in cross-section, of a broad U, the central part being substantially flat and horizontal, while the edges 4' turn upward and outward on an easy curve.

At 6 6, directly above the open space, the yoke is provided with brackets or bearings upon which are mounted the slot-rails, which are secured in place in any suitable way.

The side walls of the conduit are formed by the loose or detachable side cover-plates 8, the upper ends 8' of which are bent at an angle and are adapted to rest upon the outer edges of the flanges 7' of the slot-rails, the plates extending from their engagement with the slot-rails down to the outer edges of the turned-up portions 4' of the plates 4, against which they rest. These plates need not be fastened to the yokes or other parts of the conduit, as they will be held in place with sufficient security by the earth or pavement surrounding the conduit.

It will be understood from the description of my invention thus far given that the conduit can be built up or constructed according to my invention at comparatively little expense and with great ease and rapidity, little or no fitting and bolting of the parts being required except to hold the rails in proper position.

The conduit which is thus formed gives ample room for all the mechanism necessarily mounted therein and for the free travel of the collecting trolley, shoe or grip, and at the same time does not require the digging of a deep trench for the yokes. The ends of the plates 4 telescoping or fitting into each other, as described, constitute a ready means of uniting the parts of the conduit and insure that the yokes shall be at proper distances apart, and when the yokes are secured to the rails and the earth filled in around them and the plates 4 and 8 a solid and substantial conduit is formed, which is particularly applicable to electric railways, but which may also be used in connection with cable systems. The length of the plates 4 is about five feet, and the yoke is preferably arranged midway between the ends.

As before stated, my invention is especially intended for use in connection with electric-railway systems, and particularly with systems in which a continuous conductor is carried upon one side of the slot, and sectional conductors, suitably connected with a feed-wire, upon the opposite side of the slot. To provide for mounting and properly insulating these conductors I construct the yokes with the insulator-boxes 9 9, which extend to substantially the level of the street, where they are provided with the removable covers 10. The boxes 9 open at their lower portions into the conduit-space at a level below that of the brackets or supports 6 for the slot-rails.

Figure 1:
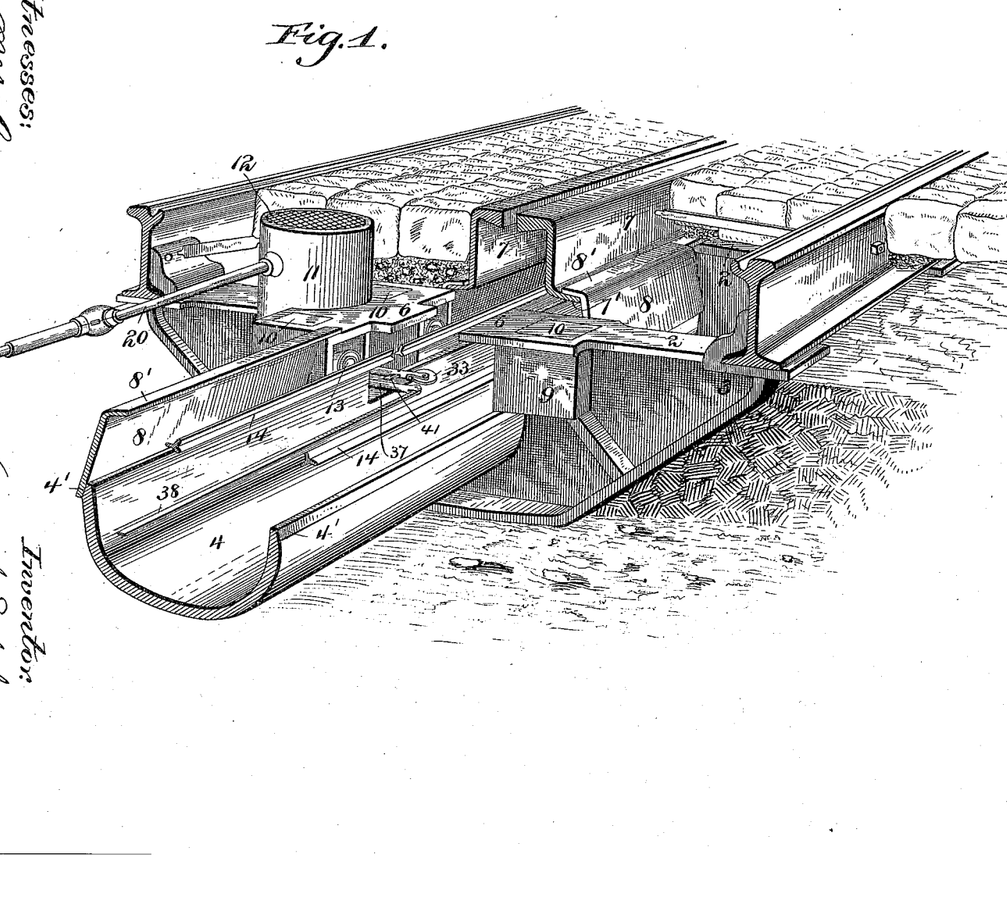
Figure 1 is a perspective view of an underground electric railway embodying my improvements, parts being broken away and parts shown in section.
Figure 2:
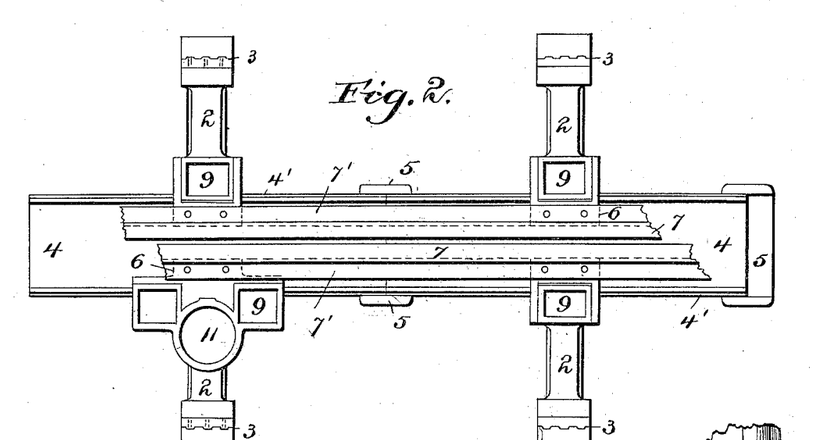
Fig. 2 is a top plan view, parts being broken away, of two of the yokes and the parts immediately associated therewith, this view being upon a smaller scale than Fig. 1.

Certain of the yokes, usually every sixth one employed, are formed with switch-boxes 11, the upper open ends of which are adapted to be closed by the covers 12 at the street level, while their lower portions open into the conduit-space preferably at a level below the openings into the insulator-boxes 9. I prefer that each yoke which is provided with a switch-box should also have three insulator-boxes 9, one arranged across the slot and substantially opposite to the switch-box, and having an insulator-support for the continuous conductor, and two insulator-boxes for the sectional-conductors, arranged on the same side of the slot as the switch-box, with the switch-box between them, and preferably set back somewhat farther from the slot than they are, all of which appears in Figs. 1 and 2.

The boxes which constitute the compartments in which are mounted the insulators and the switches, being cast integral with the yokes and opening only into the conduit and at the top, are preferably water-tight, provided, of course, a tight cover be employed, which is always the case. As a matter of precaution, however, I prefer to cause the floor or bottom of each of these boxes to incline toward the floor of the conduit, so that should any water by accident or otherwise collect therein it will readily drain into the main circuit.

13 indicates an insulator of the best insulating material and adapted to be suitably secured within one of the switch-boxes 9. The outer end of this insulator flares to form a skirt 13', and its end is preferably corrugated, as shown at 13'', to present a large insulating-surface to pervent leakage of current, and to prevent, as far as possible, the collection of moisture.

14 indicates one of the conductors, which may be of any suitable material and formed into any desired shape, the conductor shown being of substantially Y shape in cross-section, the diverging arms of the Y being arranged to face the center of the conduit, and the conductors upon the opposite sides of the slot being arranged opposite to each other, so that the trolley or shoe carried by the car readily engages with them.

I will next describe the mechanism whereby the sectional conductors are successively connected with the feed-wire, and then disconnected therefrom by the passage of the car.

It must be understood that a switch-box 11 is arranged adjacent to the contiguous ends of each two sectional conductors and that by means of switch mechanism mounted in such box the passage of the electric current to one or the other contiguous conductor is controlled. This part of my invention has for its object to so arrange and dispose the switch-controlling devices and the connecting mechanism between adjacent switch devices that a very shallow conduit may be used; and, further, to so combine and dispose the switch operating and controlling parts that a passing car operates always to turn the current onto the sectional conductor immediately in advance of the car and turn off the current from the sectional conductor which the car has just left; and, further, to so dispose and combine such operating parts that, while they are operated as just set forth, still a second car may approach close to a car in advance, thus permitting two or more contiguous sectional conductors to be connected with the feed-wire at the same time, so that the motor on each car may always be supplied with current, each car, however, as it passes each switch device operating to turn the current onto the section in advance and off from the section in the rear. I will now proceed to describe the mechanism whereby these objects of my invention are attained.

Within the switch-box 11 is mounted and suitably supported a short distance above the bottom of the floor of the box a plate 15. This plate supports the mechanical means whereby the passing of a car operates to turn the switches so as to successively cut into and out of circuit the sectional conductors. Above the plate 15, and, if found desirable, supported thereby, is mounted an insulating plate or block 16, upon which are mounted the switch and the various electrical connections between the feed-wire and the sectional conductors. This switch mechanism is preferably surrounded by a casing or boxing 17 and is closed at the top by a cover 18 secured to the casing, this cover 18 being directly below the cover 12 to the switch-box 11. The feed-wire 20 enters through an opening 27 in the casing 17 and has connection with a binding-post 19, upon which is mounted a spring-lever 21, having electrical connection with the said binding-post. This lever is so mounted as to oscillate freely around the axis of the binding-post and has diverging arms which are adapted to be brought respectively into engagement with the contact springs or pieces 23 and 23', which are connected, respectively, with binding-posts 24 and 24', from which proceed the wires 25 leading to the sectional conductors, one of these wires leading to the sectional conductor upon one side of the switch-box and the other to the conductor upon the opposite side.

Figures 3, 9, 10:
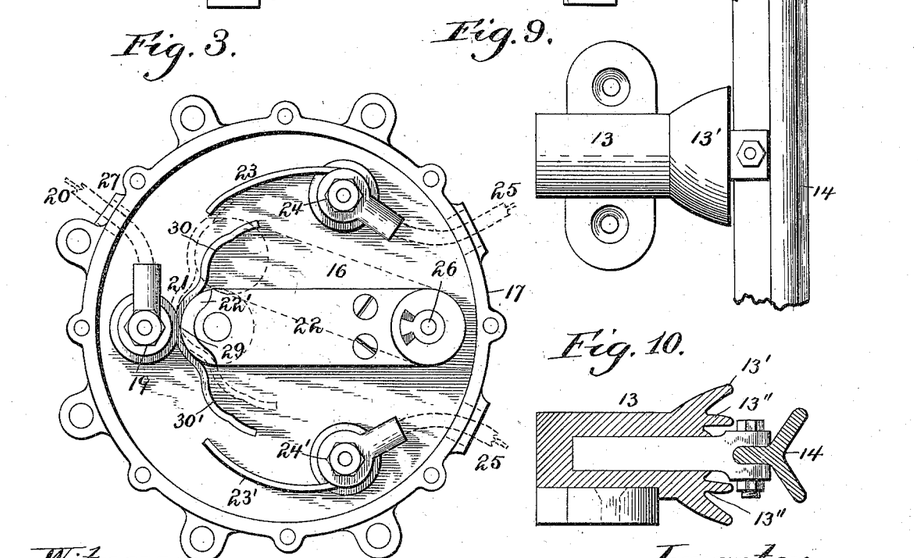
Fig. 3 is a plan view of one of the switches employed.
Fig. 9 is a plan view of one of the insulators for the sectional conductor.
Fig. 10 is a sectional view of the same.
Figure 4:
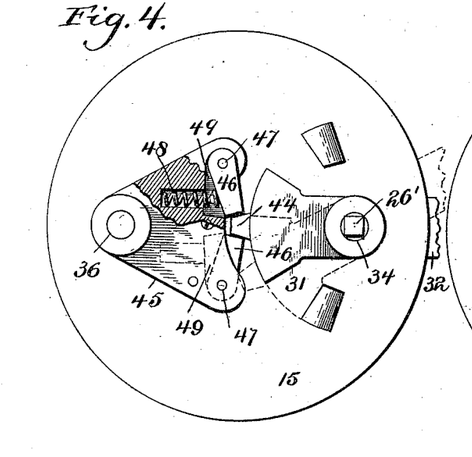
Fig. 4 is a plan view, partly in section, of parts of the shifting mechanism or gearing which operates the switch.

An operating-lever 22, made entirely or in part of insulating material, has engagement with and operates the switch-lever 21. The end of the lever 22 carries a wheel 22', which is adapted to engage with one or the other of three seats or engagement surfaces 29, 30 and 30' on the switch-lever. The seat or engagement surface 29 is arranged midway between the seats 30 and 30', and when the end of the lever 22 is in engagement therewith the switch-lever is in its mid-position, as indicated in full lines, Fig. 3, and both of its arms are out of contact with the contact-pieces 23 and 23', so that no current enters from the feed-wire 20 and passes to either of the sectional conductors which have connection with this particular switch device. When the lever 22 is moved to one side—for instance, into the seat portion 30 of the lever, as shown in dotted lines in Fig. 3—the switch-lever 21 is rocked upon its axis, and one of its arms is brought into engagement with the contact 23, so that there is then established connection from the feed-wire to the sectional conductor which is connected with the contact 23. When the lever 22 is moved in the opposite direction, contact is made with the piece 23', and the feed-wire is then put into connection with the other sectional conductor, as will be understood.

The diverging arms of the switch-lever are preferably somewhat elastic, as are also the contacts 23 and 23', and the lever is so shaped between the seat or engagement surfaces before described that the end of the operating-lever 22 cannot pass from one seat to another without springing the arm of the lever as it passes the curved projection which separates the adjacent seats. This insures a quick separation of the contacts when the current is broken, and reduces danger of sparking.

The lever 22 is mounted upon a shaft 26, which is axially in line with and connected so as to turn with a shaft 34 mounted in the plate 15, and carrying an arm or lever 31. This shaft also carries an arm 32, which extends out into the conduit and is provided with a contact-roller 33, with which engages the trolley, shoe or other contact device carried by the car.

A single continuous shaft might be used in lieu of the shafts 26 and 34; but I prefer the construction shown, wherein the shafts are separable one from another and coupled or connected together by means of the angular pin or projection 26' carried by one of the shafts and entering a correspondingly-shaped socket in the other one. This construction permits the plate 16 and the switch mechanism carried thereby to be readily removed from the plate 15, and the shifting devices carried thereby, whenever it may be necessary—as, for instance, when repairs to the electrical connections are required.

The shaft 34 is connected with another shaft 36 by gearing which will be hereinafter described, which shaft 36 is provided with an arm 37 extending outward into the conduit-cavity, and preferably arranged directly below the arm 32 carried by the shaft 34. The gearing connection between these two shafts 34 and 36 is such that when the arm 32 is moved in one direction the arm 37 is moved in the opposite direction.

As described in my aforesaid patent, the adjacent switch devices are connected with each other in series, so that the sectional conductors are successively brought into electrical connection with the feed-wire as the car travels along the road, and the connections between the adjacent switch devices are the rods 38. Each rod is connected at one end by a pivot-pin or other suitable joint 39 with the arm 37 of one switch device and at its opposite end with the arm 32 of an adjacent switch device. The end 41 of the rod 38, which connects with the arm 32, is provided with a slot 42, through which passes the connecting-pin 43. The length of the connecting-rod is such that when the parts are in their normal position—that is, when the sectional conductors are not in electrical connection with the feed-wire—and the arms 30 and 37 project directly out into the conduit, one above the other, the connecting-pin 43 occupies a mid-position in the slot 42. The length of the slot is such that the lever or arm 32 may be moved from its normal or central position to an extreme position in either direction without imparting any motion to the connecting-rod 38; but when it is thus rocked to an extreme position the pin 43 comes into engagement with one or the other end of the slot. (See Figs. 11 and 12.)

It will be observed that the levers or arms 32 and 37 extend outward horizontally into the cavity, and that they move in horizontal planes. This arrangement permits the arms to be mounted close together, one directly above the other, and no more vertical space is required for their movements than is necessary to arrange or mount them. By disposing the parts so that the arms or levers to which the connecting-rods between adjacent switch devices and the contact arms or levers for the trolley or shoe may be arranged to move horizontally, I am enabled to much reduce the depth of the conduit, as compared with systems in which these parts move in vertical planes.

I will now describe the operative connections or gearing arranged between the shafts 34 and 36, by means of which motion is imparted from one shaft to the other. The arm 31, carried by the shaft 34, is provided at its end with a pin or tooth 44. The shaft 36 carries a plate or arm 45, which extends toward the shaft 34, and is provided at its outer end with two teeth 46, between which is a space sufficient in size to accommodate the tooth 44 of the arm 31. It will be understood that these arms and teeth constitute the preferred form of gearing between these two shafts, by means of which the shafts are caused to turn simultaneously though in opposite directions so long as the tooth 44 is situated between and in engagement with the teeth 46.

For a purpose which will be presently set forth, I prefer that the teeth 46, carried by the arm of plate 45, should not be rigid, but that they should yield or be capable of movement into the body of the plate or arm 45, by which they are carried. To this end they are pivotally supported, as at 47, in recesses 49, formed in the body of the plate 45, and springs 48, suitably seated in sockets or recesses, bear against the said teeth and hold them in their outer positions with yielding force.

I will now describe the positions which the switch devices and the connecting means between the adjacent switch devices assume under different conditions of travel.

Figures 8, 11, 12, 13:
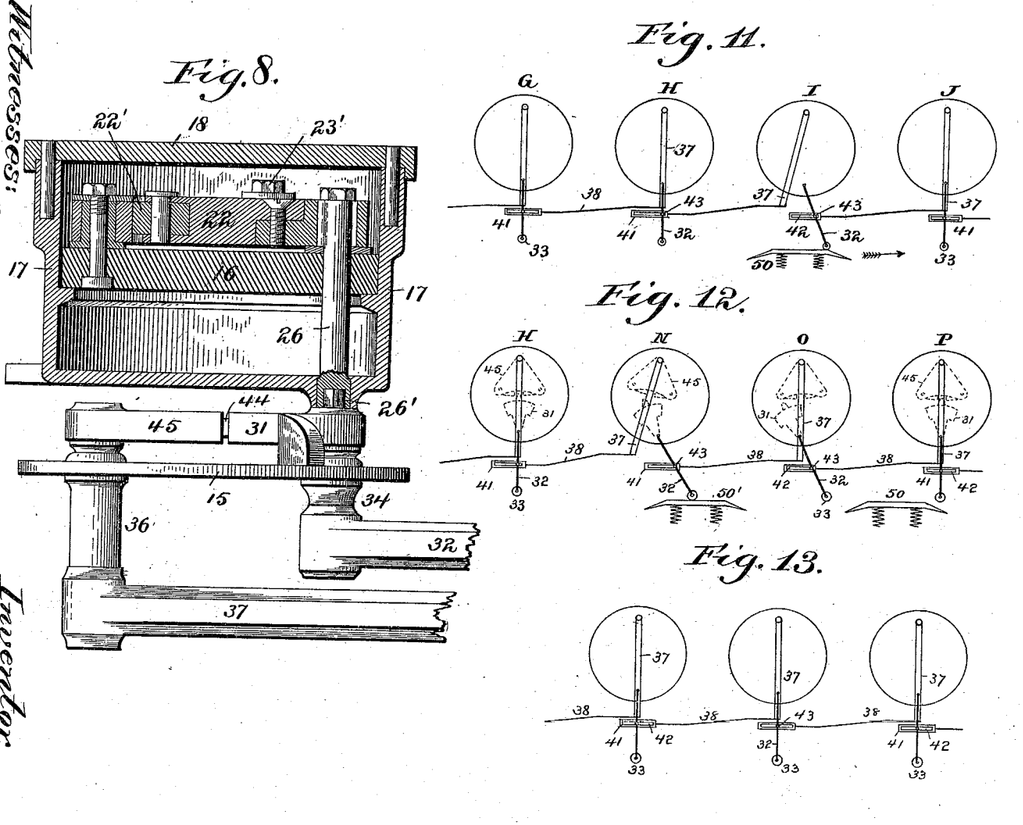
Fig. 8 is a sectional elevation showing one of the switches and the gearing or mechanism for operating it.
Figs. 11, 12, and 13 are diagrammatic views illustrating the different positions of the shifting mechanism which operates the switch under different conditions of travel.

In Fig. 13 are represented the normal positions of the lever-arms 32 and 37 and the connecting-rods 38—that is, when the sectional conductors controlled by the devices indicated in this figure are all out of connection with the feed-wire. When the connecting devices between the two adjacent switches are in this position, the switches themselves each occupy a position indicated by the full lines in Fig. 3.

In Fig. 11 are indicated the positions of the parts of four adjacent switch devices G H I J when the trolley or shoe 50 of a car moving in the direction of the arrow engages the contact-roller 33 of the switch device lettered I. This contact of the shoe with the roller results in moving the lever 32 to the right, and by reason of the gearing connection between the shafts 34 and 36, hereinbefore described, the arm 37 is moved in the opposite direction or toward the left. This movement of the parts at the switch I in no wise changes the positions of the parts of the switch device J, which is the one next in advance of the car, for the reason that the pin 43, which connects the arm 32 with the rod 38, moves, as the arm is rocked, in the slot 42, as has been described, and therefore imparts no movement whatever to this connecting-rod 38. The switch device J therefore remains in its normal position. The movements of the parts of the switch device I are, however, communicated to the switch device H, which is the one next in rear of the car, for the reason that the jointed connection between the arm 37 and the rod 38 does not permit of lost motion, and the switch device I is therefore restored to normal position, the right-hand end of the slot 42 being, however, still in engagement with the pin 43. It must now be remembered that the position of the parts at the switch device H while the car was between the switches H and I was like that indicated at the switch device I in Fig. 11—that is to say, the arm 32 of the switch device H was inclined to the right, the pin 43 was in engagement with the right-hand end of the slot of the connecting-rod 38, and the arm 37 was inclined to the left. The movement of the arm 37 of the switch device H resulting from the action of the trolley upon the switch device I moves the connecting-rod 38, between such arm 37 and the arm 32 at switch G, to the right without, however, imparting any motion to the switch or its operating devices, this being permitted by the slot 42.

While the trolley or shoe is traveling between the switch devices I and J the positions of the parts of the several devices shown remain as indicated in this figure, the only sectional conductor taking the current being the one next in advance of and controlled by switch H. When the shoe comes to the switch device J, the operations just described are repeated, and so on as the car advances.

Should the car be moving in the opposite direction from that indicated by the arrow in Fig. 11, the same relative positions and movement of parts indicated in this figure would result, except that the inclination of the levers will be reversed, and the succession in which the switches will be brought into operation and cut out of operation will be reversed.

In Fig. 12 are shown four contiguous switch devices illustrating the positions of the parts when a second car comes onto a sectional conductor at the same time that another car is on the next section immediately in advance. In this figure, 50 represents the trolley or shoe of the car in advance, and 50' the trolley or shoe of the following car. It will be understood that the first car has engaged with and operated the switch device O and is on the section controlled thereby, and that the car carrying the shoe 50' has come up and operated the switch N and passed into the conductor which it controls. The advance car has operated the switches in the same way as has been described in connection with Fig. 11, and therefore no further description is deemed necessary so far as the advance car is concerned. The engagement of the shoe 50' with the contact-arm at N moves the arm 32 to the right and the arm 37 to the left. This results in shifting the connecting-rod between the switch devices N and O to the right and restores the lever 37 of the switch device O to its mid-position without, however, moving the arm 32 of the switch O, as the gear connection between the shafts 34 and 36 is such that while the arm 32 cannot be moved from its inclined to its mid position without operating upon the gearing of the lever 36 still the shaft 36 and its arm 37 may be moved to their mid-position from either direction without communicating motion to the shaft 34 and its arm, supposing that both levers are in an inclined position when this movement begins. The result is that the arms 32 of the two adjacent switches N and O are both inclined in the same direction, thereby bringing into connection with the feed-wire the two adjacent sectional conductors which they control.

I will now suppose that the car carrying the trolley or shoe 50 passes on and reaches the switch device indicated at P before the car carrying the trolley 50' reaches the switch device O. The trolley or shoe 50 will move the parts of the switch device P, as has been described, and this movement will restore the arm 32 at the switch device O to its mid-position, the arm 37 having been before brought to a mid-position, as described, by reason of the engagement of the trolley 50' with the arm 32 at switch device N. This movement of the arm 32 at O from a position inclined to the right to a central position, while the arm 37 occupies a mid-position, is permitted by so constructing the gearing connections between the shafts 34 and 36 that a part of the gearing yields to permit another portion to pass it without at the same time motion being imparted from one shaft to the other.

Figure 5:
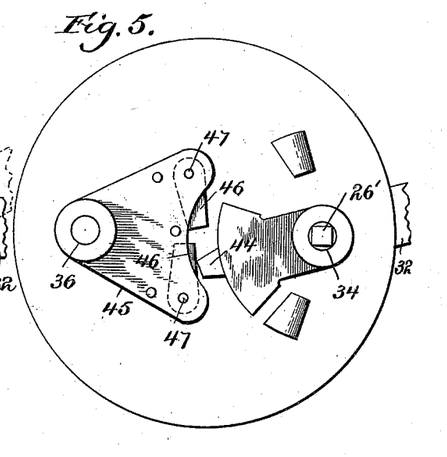
Fig. 5 is a similar view showing the same parts in a different position.
Figure 6:
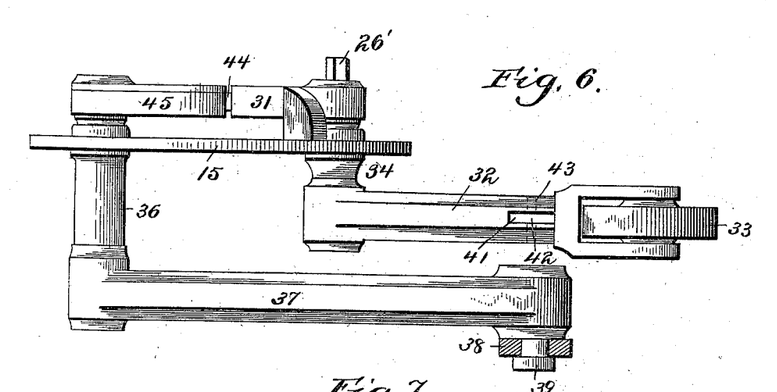
Fig. 6 is an elevation of the parts represented in Figs. 4 and 5.
Figure 7:
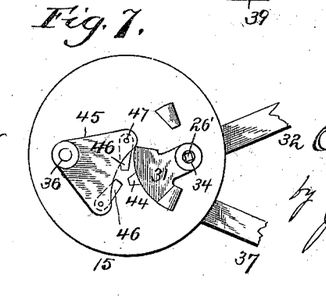
Fig. 7 is a plan view of the same parts, on a reduced scale, showing a different position from that shown in any of the other views.

As shown in Fig. 5, the tooth 44 can move from either side past a tooth 46 to its mid-position while the plate or arm 45 occupies a central position, the tooth 46 being pressed against the spring 48 into the cavity 49 while the tooth 44 is passing it.

It will be understood that the movements of the arms 32 control the operation of the switches proper with which they have connection.

It will be observed that the mechanical connection between each switch and the switch in rear thereof, when the switch is in its normal position, is unbroken—that is to say, it is such a connection that whenever the switch is moved from such normal position it controls the switch in rear thereof; and it should also be observed that the mechanical connection between each switch and the switch in front is a broken connection, by which I mean a connection of such construction that motion imparted to the switch is not communicated through the connection to the switch in advance thereof, and therefore under no circumstances does the movement of a switch operate or control the position of the switch in advance.

The novel manner of connecting together the adjacent switch devices which I have illustrated and described meets all the requirements of heavy traffic, and at the same time insures that only those sectional conductors which are actually in use shall be in connection with the feed-wire.

Having thus described my invention, what I claim, and desire to secure by Letters Patent, is—

1. In a conduit-railway system, the yokes having transverse arms adapted to receive the rails, and laterally-arranged plates in line with the conduit-openings through the yokes, the plates being broad U-shaped in cross-section, and having their ends adapted to fit together, the transverse arms of the yokes being arranged substantially midway between the opposite ends of the said laterally-arranged plates, substantially as set forth.

2. In a conduit-railway system, the combination of the yokes, slot-rails supported thereby, plates which constitute the bottom of the conduit extending in line with the conduit, and detachable side plates extending between the slot-rails and the said bottom plates, substantially as set forth.

3. In an electric-railway conduit system, a yoke formed integral with a switch-box which opens in its lower part into the conduit, substantially as set forth.

4. A yoke for an electric railway provided with a box or compartment for an insulator, and also with a box or compartment for the switch, both said boxes or compartments opening into the conduit-opening, the opening into the switch-compartment being lower than that into the insulator-compartment, substantially as set forth.

5. A yoke for an electric railway formed with a single insulator-box upon one side of the slot, two insulator-boxes upon the opposite side of the slot, and a switch box or compartment arranged between the two last-referred-to insulator-boxes, substantially as set forth.

6. A yoke for an electric-railway conduit system having the transverse arms and supports for the slot-rails, and provided with laterally-extended plates, 4, which constitute the bottom of the conduit, and with insulator-boxes upon the opposite sides of the slot, and with a switch-box, the said parts being cast integral, substantially as set forth.

7. In an electric-railway conduit system, a conduit in which moves the shoe or trolley carried by the car, a conductor formed into a series of separate insulated sections, a main feed-conductor, switch devices arranged to connect the sectional conductors with the main feed-conductor, connections between the said switch devices, whereby movement at one switch device causes movement at an adjacent switch device, the said connections being arranged to move in horizontal planes, and contact-arms projecting into the conduit-cavity to be engaged by the said shoe or trolley and also moving in horizontal planes, substantially as set forth.

8. In a conduit electric railway, the combination of a yoke provided with a switch-box opening into the conduit, a plate, 15, on which are mounted a contact arm or lever and an arm or lever, 37, gearing arranged between the said arms, a switch device supported by the said plate but separated therefrom, and a connection between one of the said arms or levers and the switch, substantially as set forth.

9. In an electric conduit railway, a sectional conductor, switch boxes or compartments, arranged adjacent to and opening into the conduit, switches arranged in the said boxes and controlling the connections between the feed and the sectional conductors, contact-arms by which the said switches are operated, and connection-arms to which the connecting devices between the switches are connected, and gearing interposed between the said arms at each switch device, the said gearing being arranged within the said switch-boxes, substantially as set forth.

10. In an electric conduit railway, a sectional conductor, switch boxes or compartments, arranged adjacent to and opening into the conduit, switches arranged in the said boxes and controlling the connections between the feed and the sectional conductors, horizontally-moving contact-arms extending into the conduit, by which the switches are operated, horizontal connection-arms, 37, also extending into the conduit, connecting devices between the said arms of adjacent switches, and gearing interposed between the said arms at each switch device, the said gearing being arranged within the said switch-boxes, substantially as set forth.

11. In an electric railway, a sectional working conductor, a series of switch devices therefor, means for operating the switches successively, and mechanical connections between each switch device and other switch devices on either side thereof, the connections between each switch and the switch in rear being, when the switch is in normal position, unbroken, whereby each switch upon being moved controls the switch in rear, and the connection between each switch and the one in front being a broken connection, whereby the movements of any switch do not control the position of the switch in advance, substantially as set forth.

12. A series of switch devices for an electrical railway each having two arms, one a contact-arm controlling the switch proper, and the other a connection-arm, connections between the said switch devices, each connected at one end with one of said arms at one switch device and with the other of said arms at another switch device, and gearing interposed between the said arms, having yielding portions whereby the arms may have certain independent movements relative to each other, substantially as set forth.

13. In an electric railway, the combination of a sectional working conductor, a series of switch devices therefor, each having a contact-arm, 32, an arm, as 37, the contact-arm being connected with the switch proper, gearing interposed between the said arms whereby they are caused to move simultaneously, whenever the contact-arm moves to turn on the current, the said gearing having a yielding portion whereby the arms may be restored to normal positions independently of each other, and connection-rods between the said switch devices, connected with the said arms, substantially as set forth.

14. In an electric railway, a sectional working conductor, a series of switch devices therefor, each having a contact-arm which controls the switch directly, and a connection-arm geared with the contact-arm, mechanical connections between each switch device and other switch devices in front and rear thereof, each of such connections connecting at one end with a contact-arm and at the other end with one of the connection-arms, the connection with one of the said arms permitting lost motion, and gearing interposed between the said arms, such gearing being broken when the switch is moved into position to make connection with the feed or main conductor, thereby permitting independent movements of the said arms, substantially as and for the purposes set forth.

15. A switch device for the sectional conductor of an electric railway, having a contact-arm connected therewith and controlling the switch and another arm, as 37, and gearing arranged between the said arms constructed to operate substantially as described to cause the arms to move together when the contact-arm is moved from its normal position to make electrical connection at the switch, and to break or partially disengage when the switch is moved to make contact, thereby permitting independent movement of the arms when they are restored to their normal positions, substantially as set forth.

16. In an electric railway, a sectional working conductor, a series of switch devices therefor, each having a contact-arm and an arm, 37, mechanical connections between adjacent switch devices, each connection being connected at one end to one of the said contact-arms, and at the other end to one of the arms, 37, and gearing arranged between the said arms and operating substantially as described to cause the arms to move together when the contact-arm is moved from its normal position to make electrical connection at the switch, and arranged to break or partially disengage when the arms come into position to make such electrical connection thereby permitting independent movement of the arms when they are restored to their normal positions, substantially as set forth.

17. In an electric railway, the combination of the working sectional conductor, a series of switch devices, each switch device consisting of the switch proper, a contact-arm 32, an arm, 37, gearing between the said arms, 32 and 37, and a connection between the contact-arm, 32, and the switch proper, and the connecting-rods, 38, between adjacent switch devices, each rod being connected at one end to the arm, 37, of one switch, and at the other to the arm, 32, of another switch, the connection with one of said arms permitting a certain amount of play or lost motion, substantially as set forth.

18. In a switch for an electric-railway system, the combination of a contact, 23, for a sectional conductor, a lever, 21, connected with the feed-conductor, the said lever having an arm of elastic or spring material, and formed with two seats, 29 and 30, with a projecting portion between them, and a lever, 22, for operating the contact-lever having an end which fits in said seats, and which causes the arm of the lever to spring as it passes from one seat to the other, and also serving to hold the contact-lever firmly in engagement with contact, 23, or out of engagement therewith, substantially as set forth.

19. In an electric railway, the herein-described connecting mechanism for operating adjacent switch devices including connecting-rods, the arms or levers to which the rods are connected, a gearing interposed between the said arms or levers, said gearing consisting of an arm or plate provided with a rigid tooth and connected with one arm or lever, and an arm or plate provided with two yielding teeth carried by the other arm or lever, substantially as set forth.

20. In an electric railway, the combination of the connecting-rods, the arms or levers, 32 and 37, to which the connecting-rods are secured, a plate or arm, 31, having a rigid tooth, 44, connected with the shaft of one arm or lever and a plate or arm, 45, carried by the shaft of the other arm or lever, the last said plate or arm being provided with two teeth, 46, which are held in position to engage the tooth, 44, by springs, but which yield to permit the tooth 44 to pass them in moving toward a position between the said teeth, 46, substantially as set forth.

In testimony whereof I affix my signature in the presence of two witnesses.

OSCAR A. ENHOLM.

Witnesses:
LEONIDAS DENNIS,
HOWARD HORTON.